United States Patent [19]

Steigerwald

[11] 4,241,250

[45] Dec. 23, 1980

[54] INDUCTION COOKING SYSTEM

[75] Inventor: Robert L. Steigerwald, Scotia, N.Y.

[73] Assignee: General Electric Company, Schenectady, N.Y.

[21] Appl. No.: 51,719

[22] Filed: Jun. 25, 1979

[51] Int. Cl.³ .................. H05B 6/08; H02M 7/537
[52] U.S. Cl. ...................... 219/10.49 R; 219/10.77; 363/131; 363/97; 323/22 T; 307/253
[58] Field of Search .............. 219/10.49 R, 10.77; 363/131, 97, 98, 96, 28, 89, 19, 37, 57, 80, 135; 323/22 T, 18; 307/253, 252 M, 252 T

[56] References Cited

U.S. PATENT DOCUMENTS

| 3,733,540 | 5/1973 | Hawkins | 363/89 |
| 3,930,193 | 12/1975 | Kornrumpf et al. | 219/10.77 X |
| 4,115,676 | 9/1978 | Higuchi et al. | 219/10.49 R |

*Primary Examiner*—B. A. Reynolds
*Assistant Examiner*—Philip H. Leung

*Attorney, Agent, or Firm*—Marvin Snyder; James C. Davis

[57] ABSTRACT

An induction cooking system comprises at least one induction surface unit which includes an induction coil operatively positioned adjacent to a metallic, food-containing utensil. A switching means is coupled in series with the coil across a source of rectified AC and is rendered conductive at a prescribed rate to energize the coil, causing the coil to generate magnetic flux which, in turn, causes eddy currents to be circulated in the utensil surface. The circulating eddy currents in the utensil surface result in joule losses causing food heating. Reactive energy present in the induction coil during intervals when the switching means is non-conductive is stored in a reactive power converter for subsequent discharge across the source of rectified AC. Selectively discharging the reactive power converter during the valleys of the AC input wave to the induction coil allows the coil to be energized during the entire 360° of the AC input wave, thus realizing an efficient induction cooking system.

6 Claims, 7 Drawing Figures

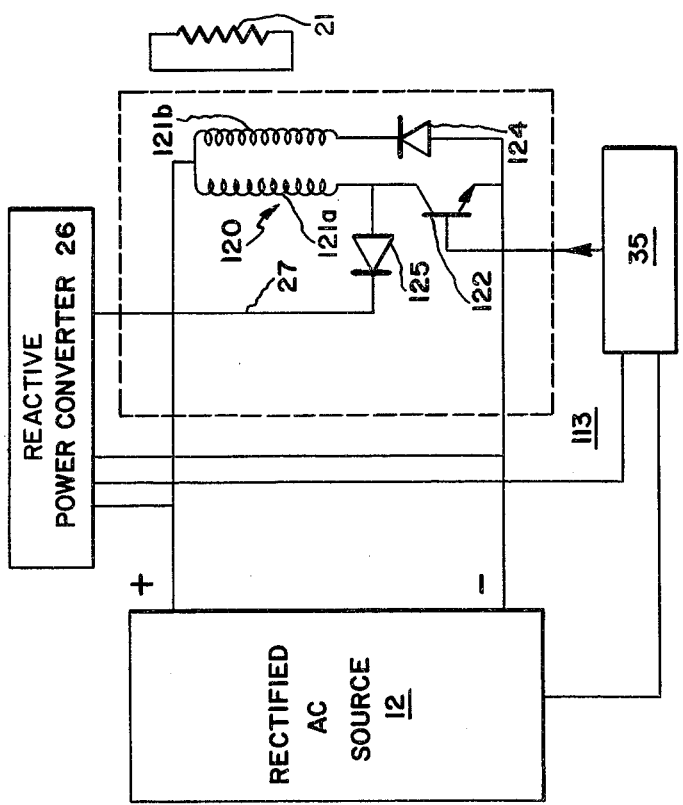
Fig. 5
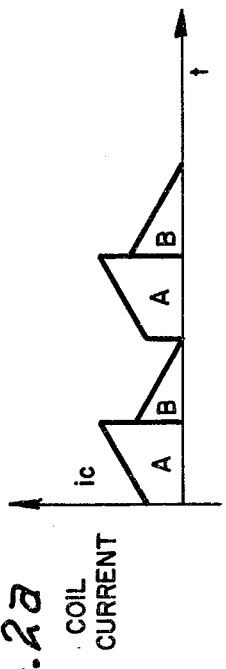
Fig. 2a COIL CURRENT
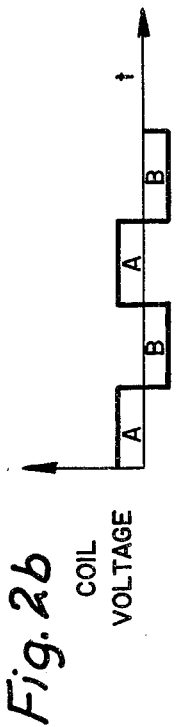
Fig. 2b COIL VOLTAGE
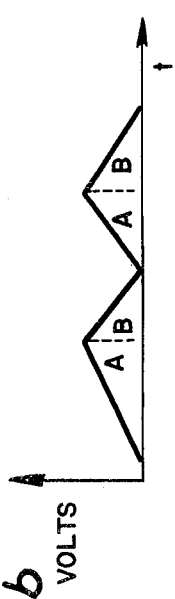
Fig. 3b VOLTS
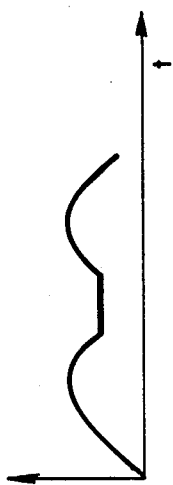
Fig. 3a

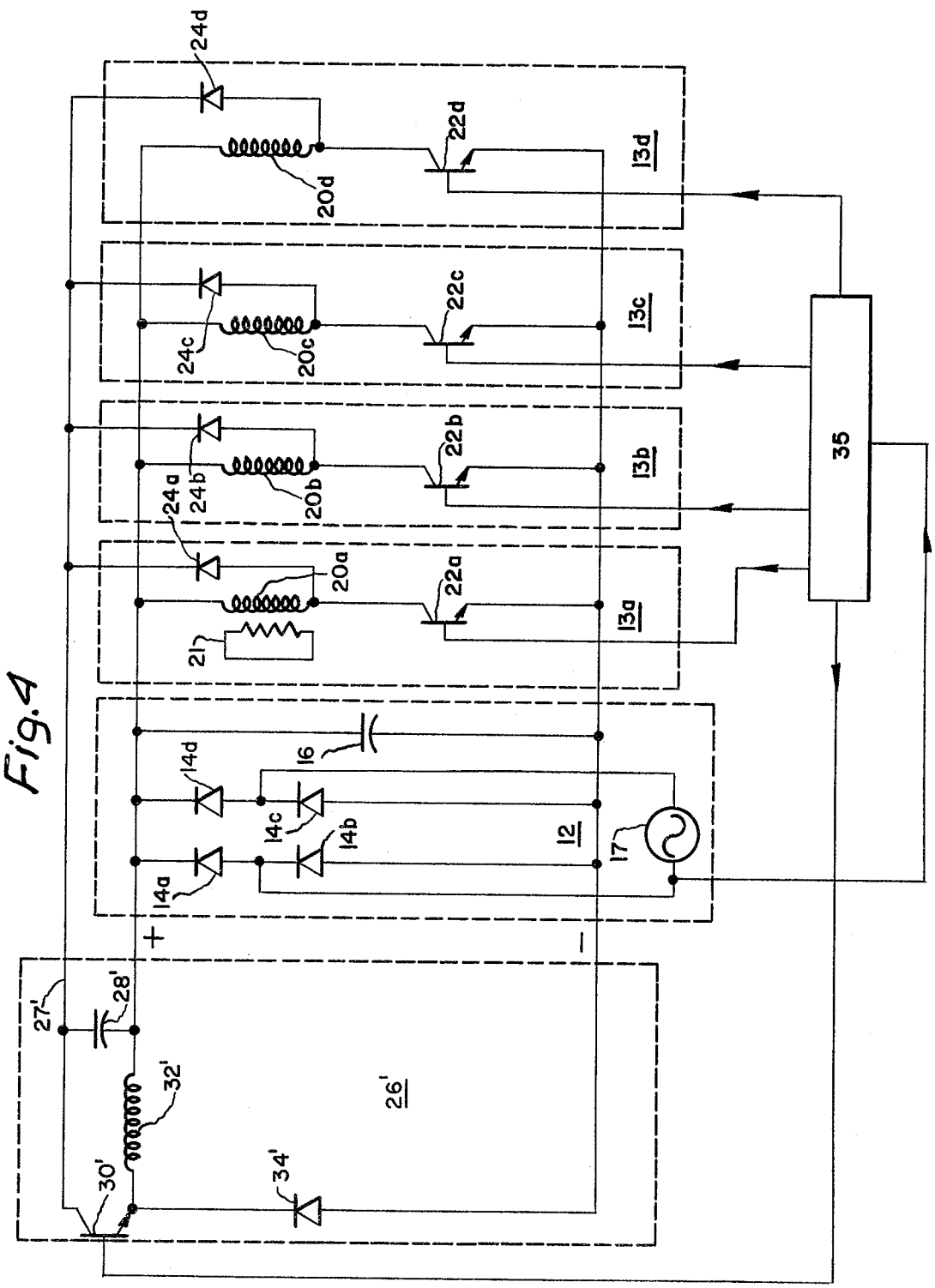

INDUCTION COOKING SYSTEM

BACKGROUND OF THE INVENTION

This invention relates to an induction cooking unit, and more specifically, to a power supply circuit for efficiently energizing an induction coil, causing the same to generate magnetic flux which causes eddy currents to be circulated within the surface of a metallic utensil for heating food.

The principal of induction cooking, that is energizing an induction coil in operative relation to a metallic utensil to circulate eddy currents within the utensil surface for generating heat for cooking food, is not new. As early as 1889, the principal of induction cooking appears to have been known as evidenced by U.S. Pat. No. 400,978 issued to H. F. Watt on Apr. 9, 1889.

Until recently, low frequency alternating current was used to power induction coils for induction cooking. This did not provide satisfactory because of the large conductor requirements and also because of the audible noise associated with the alternate attraction and repulsion of the metallic cooking utensil to the coil. Recent advances have lead to the discovery that the use of high frequency current substantially reduces these problems.

Presently, high frequency induction cooking systems such as thos described and claimed in U.S. Pat. No. 3,781,503 issued to J. D. Harnden, Jr. et al. on Dec. 25, 1973 and assigned to the assignee of the present invention, utilize either series resonant or parallel resonant inverter power circuits to excite the induction coil from a DC source. Such series resonant or parallel resonant inverter power circuits are typically comprised of a resonant circuit formed of the induction coil and a capacitor. The resonant circuit is serially coupled with the gate-anode portion of an SCR or the collector-emitter portion of a power transistor across a DC source. The transistor or SCR is rendered conductive at a frequency of at least 18 kHz to energize the coil with AC.

The series and parallel resonant induction cooking circuits, although both providing good coil excitation each require a complex control scheme for controlling SCR or transistor conduction to regulate coil current. Unless transistor or SCR conduction is well regulated, substantial current is present in the coil when the cooking utensil is removed (defined as the "unloaded condition") because of the substantial increase in the quality factor (Q) of the resonant circuits. This problem is described in further detail in U.S. Pat. No. 4,085,300 issued on Apr. 18, 1978 to R. W. MacKenzie et al.

Additionally, prior art series and parallel resonant inverter power circuits typically require a large filter capacitor coupled across the DC source, which, in turn, increases the cost of the induction cooking unit.

The present invention concerns a simple, low cost induction cooking unit which utilizes a single transistor, non-resonant inverter power circuit, for exciting an induction cooking coil.

BRIEF SUMMARY OF THE INVENTION

Briefly, in accordance with the invention, an induction cooking unit for inductively heating a metallic, food-containing utensil comprises an induction coil adapted for positioning adjacent to the metallic utensil. A switching means is coupled in series with the coil across a source of rectified AC and is rendered conductive at a prescribed rate to energize the coil. The induction coil, when energized, generates magnetic flux which causes eddy currents to be circulated in the surface of the utensil which results in joule losses and hence, food heating.

Reactive current present in the coil during intervals when the switching means is nonconductive is conducted through a diode to a reactive power converter which stores the reactive coil energy. Selectively discharging the reactive power converter across the source of rectified AC returns the stored reactive energy to the source of rectified AC, allowing the coil to be energized continuously during AC input wave.

It is an object of the present invention to provide a simple, low cost induction cooking unit.

It is another object of the present invention to provide a simple, low cost induction cooking unit which does not require a resonant inverter power circuit.

It is another object of the present invention to provide a simple, low cost induction cooking unit in which an induction coil may be energized during the entire 360° of the AC input voltage waveform.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGS. 2a and 2b are graphical representations of the current and voltage waveforms, respectively, of the induction coil employed in the induction cooking unit of FIG. 1 during operation;

FIG. 3a is a graphical representation of the output voltage waveform of the rectified AC source comprising a portion of the induction cooking unit of FIG. 1;

FIG. 3b is a graphical representation of the output voltage of the reactive power converter comprising a portion of the induction cooking unit of FIG. 1;

FIG. 4 is a schematic representation of an alternative embodiment of the reactive power converter for use in the induction cooking unit of FIG. 1; and FIG. 5 is an alternative embodiment of an induction surface unit according to the present invention.

DETAILED DESCRIPTION OF THE PREFERRED EMBODIMENT

Figure 1:
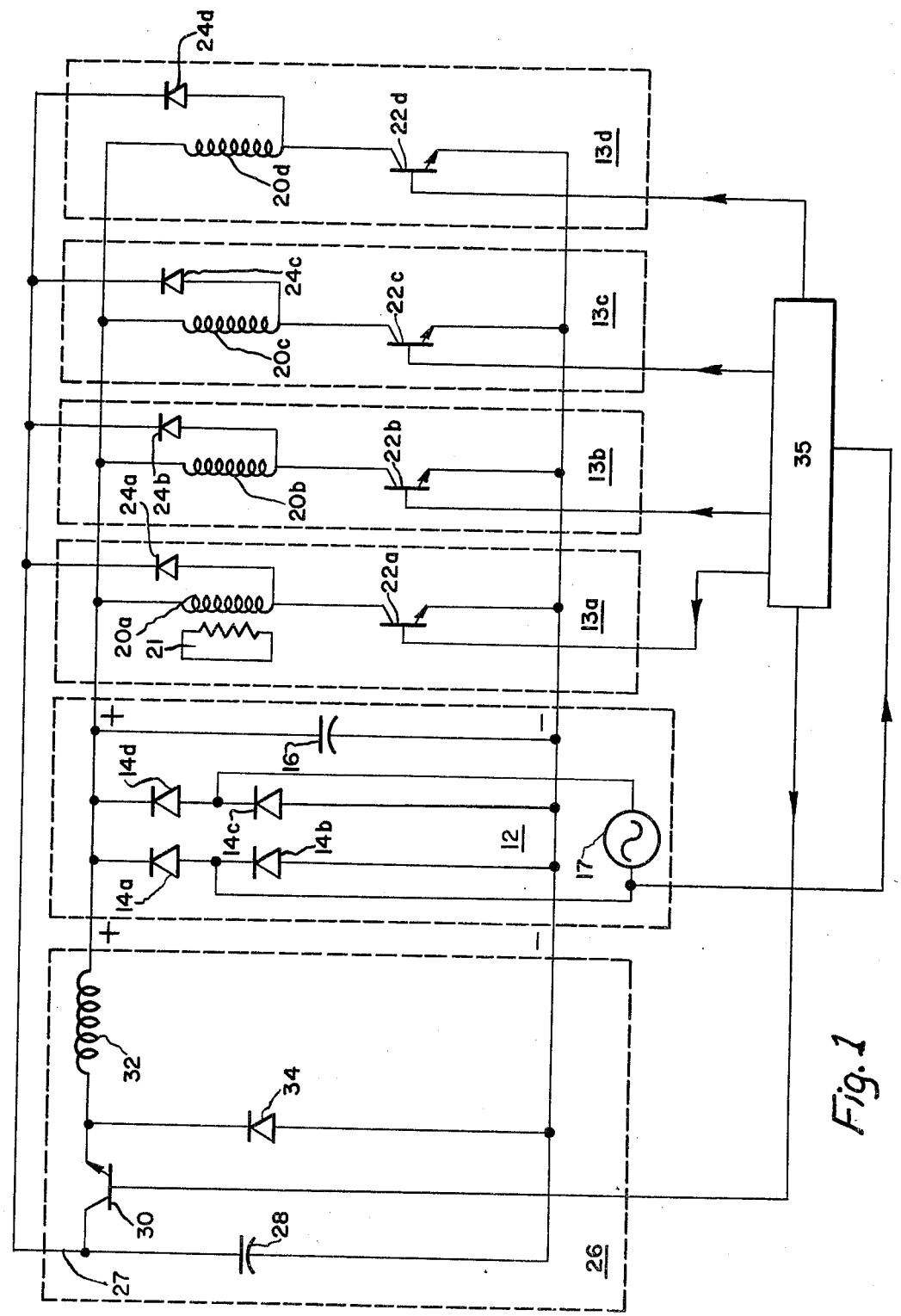
FIG. 1 is a schematic diagram of the preferred embodiment of the induction cooking unit of the present invention.

FIG. 1 shows an induction cooking system 10 for inductively heating metallic food containing utensils by causing eddy currents to be circulated within the surface of each utensil. Induction cooking system 10 comprises a source of rectified AC 12 for energizing each of induction surface units 13a through 13d, respectively. Rectified AC source 12 is typically comprised of a full wave rectifier bridge which is configured of two pairs of rectifiers such as rectifiers 14a and 14b, and 14c and 14d, the rectifiers of each rectifier pair coupled in series-aiding fashion. A high frequency bypass capacitor 16 is coupled between the cathode of each of rectifiers 14a and 14d and the anode of each of rectifiers 14b and 14c. Capacitor 16 is of such a magnitude that when alternating voltage from a commercial power source, such as 120 volt, 60 Hz., AC source 17, is applied between the junction of rectifiers 14a and 14b and the junction of rectifiers 4c and 14d, no substantial double power frequency, e.g. 120 Hz., filtering is provided by the capacitor for the voltage developed between the positive and negative source terminals, formed by the junction of the cathode of each of rectifiers 14a and 14d and the junction of the anode of each of rectifiers 14b and 14c, respectively.

Although in theory any number of induction surface units could be powered by source 12, the presently preferred embodiment illustrated in FIG. 1 comprises four induction surface units 13a through 13d, respectively, corresponding in number to the number of resistive heating elements or gas burners of an electric or gas range, respectively. Each of the induction surface units 13a through 13d, respectively, is configured of like components referenced by like numerals followed by the corresponding alphabetical characters a, b, c, or d, respectively. Therefore, only induction surface unit 13a will be described.

Induction surface unit 13a comprises a spirally wound induction coil 20a which is mounted in a horizontal position beneath a planar nonmetallic support surface (not shown) which supports a metallic cooking utensil, shown as a pan 21, in operative relation to coil 20a. The collector-emitter portion of an npn transistor 22a couples coil 20a across source 12. As will be understood by reference to the operation of induction cooking unit 10, transistor 22a is rendered conductive to conduct current to coil 20a, causing coil 20a to generate magnetic flux which results in eddy currents being circulated in the surface of pan 21 to heat the pan. A diode 24a is coupled at the anode to the junction of coil 20a and transistor 22a and is coupled at the cathode to reactive power converter 26 through bus 27. Diode 24a conducts the reactive current present in coil 20a during intervals when transistor 22a is substantially nonconductive.

Reactive power converter 26 constitutes a DC—DC stepdown chopper coupled in parallel with rectified AC source 12 and comprises a bus 27 for coupling the cathode of each of diodes 24a–24d to the first terminal of a capacitor 28, the remaining terminal of capacitor 28 being coupled to the negative terminal of source 12. During intervals when one or more of transistors 22a–22d is nonconductive, reactive energy present in a respective one of coils 20a–20d is stored in capacitor 28 for later discharge across source 12. Bus 27 is coupled to the positive terminal of source 12 by the serial connection of the collector-emitter portion of an npn transistor 30 and an inductor 32. A diode 34 is coupled at the anode and the cathode to the negative terminal of source 12 and to the junction between transistor 30 and inductor 32, respectively, to provide a conduction path for current present in inductor 32 during intervals when transistor 30 is substantially nonconductive.

Oscillator means 35 is coupled to the base of each of transistors 22a–22d and supplies each transistor with base drive signals to render the same conductive, causing a respective one of coils 20a–20d to be energized. Oscillator means 35 also supplies a base drive signal to the base of transistor 30 of reactive power converter 26, in accordance with the phase of AC source 17, to render transistor 30 conductive to discharge capacitor 28 across rectified AC source 12. Various oscillator circuits exist and are well known in the art. Therefore, the details of oscillator means 35 are not shown.

Operation of induction cooking system 10 of FIG. 1 will now be explained by reference to FIGS. 1, 2a and 2b. To simplify the details of operation, only the operation of induction surface unit 13a is set forth below, it being understood that each of induction surface units 13b through 13d, respectively, operates in an identical manner. Coil 20a of surface unit 13a is energized by source 12 during intervals when transistor 22a is rendered conductive, resulting in current, denoted $i_c$, building up in the coil as indicated by the interval A in FIG. 2a. As a consequence of the substantially linear build up of current in coil 20a during this interval, the voltage across the coil is positive (as measured between the positive terminal of rectified AC source 12 and the collector of transistor 22a) and constant as indicated by interval A in FIG. 2b.

During the interval when transistor 22 is substantially nonconductive, reactive current present in coil 20a is conducted via diode 24a and bus 27 through capacitor 28, causing the capacitor to be charged to a potential higher than that on capacitor 16 of source 12. As a result, the inductive current in coil 20a is driven to zero, as indicated by interval B in FIG. 2a. The substantially linear decrease of current through coil 20a results in a negative voltage appearing across the coil, which is indicated by interval B in FIG. 2b.

In practice, transistor 22a is rendered conductive at a frequency of at least 18 kHz. This permits sufficient magnetic flux to be generated by coil 20a for inductively heating the food in pan 21 to a desired cooking temperature. Adjusting the frequency at which transistor 22a conducts, alone or in combination with adjusting either the voltage magnitude of source 12 or the duration of transistor conduction, (that is, the transistor duty cycle), varies the magnitude of magnetic flux generated by coil 22a, allowing the cooking temperature to be adjusted as desired.

The reactive energy stored in capacitor 28 of reactive power converter 26 is discharged across source 12 during intervals when transistor 30 is conductive. By selectively rendering transistor 30 conductive during the "valleys" of the AC input wave to coil 20a, reactive energy stored in capacitor 28 can be returned to source 12 and coil 20a, allowing coil 20a to be energized during the entire 360° of the input AC wave. This may be better understood by reference to FIGS. 3a and 3b.

During the "peaks" of the AC input wave, the waveform of which is illustrated in FIG. 3a, transistor 22a is alternately rendered conductive, as described above, resulting in the charge on capacitor 28 increasing during this period as is represented by interval A in FIG. 3b. During the valleys of the AC wave, transistor 30 is rendered conductive at a selected frequency to discharge capacitor 28 across capacitor 16 of source 12 and thereby supply energy to coil 20a. By rendering transistor 30 alternately conductive in this manner, the magnitude of the discharge of capacitor 28 is regulated to prevent excessive current through source 12 and coil 20a. The discharge of capacitor 28 is represented by interval B in FIG. 2b.

An alternative embodiment of a reactive power converter is shown in FIG. 4 and is accorded the reference numeral 26′. Reactive power converter 26′ comprises a bus 27′ coupled to the cathode of each of diodes 24a through 24d of inductive surface units 13a through 13d, respectively. A capacitor 28′, for storing reactive energy present in the induction coils of each of induction surface units 13a–13d, respectively, is coupled between bus 27′ and the positive terminal of source 12. The collector-emitter portion of an npn transistor 30′ is coupled in series with an inductor 32' across capacitor 28'. The base of transistor 30' is coupled to oscillator means 35 to receive base drive signals which render the transistor conductive. A conductive path for reactive current present in inductor 32' during intervals when transistor 30' is nonconductive is provided by a diode 34' coupled at the cathode and the anode to the junction of transistor 30' and inductor 32' and to the negative terminal of source 12, respectively.

Reactive power converter 26' operates in a manner analogous to that of reactive power converter 26 of FIG. 1. During the interval when one or more of transistors 22a through 22d of induction surface units 13a through 13d is substantially nonconductive, reactive current present in a respective one of induction coils 20a through 21d, is conducted via diodes 24a–24d, respectively, and bus 27' through capacitor 28', charging the capacitor. Energy stored in capacitor 28' is then discharged when transistor 30' is rendered conductive by oscillator means 35 at a predetermined frequency in accordance with the phase of the rectified AC from source 12, which causes current to circulate through the loop comprised of transistor 30', inductor 32' and capacitor 28' when transistor 30' is conductive and through inductor 32', source 12, and diode 34' when transistor 30' is substantially nonconductive. Regulating the frequency of transistor 30' conduction thus regulates the discharge of capacitor 28' accordingly.

The configuration of reactive power converter 26' allows capacitor 28' to be discharged below the level of charge on capacitor 16 of DC source 12. This is because when transistor 30' is conductive, the energy stored in capacitor 28' is transferred to inductor 32'. The energy is then transferred from inductor 32' to capacitor 16 when transistor 30' is nonconductive, charging capacitor 16 above the level of charge on capacitor 28'.

Either of reactive power converters 26 or 26' of FIGS. 1 and 4, respectively, by storing the reactive energy present in coils 20a through 20d of induction surface units 13a through 13d, respectively, during intervals when transistors 22a through 22d, respectively, are nonconductive, and then discharging the stored reactive energy across source 12 at predetermined intervals, permits each induction surface unit to operate as if a large filtering capacitor were present in place of bypass capacitor 16 without the peak current pulses associated with such a large filtering capacitor. In this manner, a high power factor can be achieved without the associated high cost of a large filter capacitor.

FIG. 5 shows an alternative embodiment 113 of an induction surface unit coupled to rectified AC source 12 and reactive power converter 26. Induction surface unit 113 includes a spirally wound, generally planar induction coil 120 disposed horizontally beneath a planar nonmetallic support surface (not shown) which supports a metallic utensil shown as pan 21, adjacent to coil 120.

Coil 120 contains two closely coupled windings 121a and 121b. Coil winding 121a is coupled in series with the collector-emitter portion of an npn transistor 122 across source 12. The base of transistor 122 is supplied with base drive signals from oscillator means 35, rendering the transistor conductive at predetermined intervals during intervals when transistor 122 is conductive. Coil winding 121a generates magnetic flux which causes currents to be induced in the surface of pan 21. A diode 124 is coupled in series with coil winding 121b across source 12 to provide a return path to source 12 for reactive current induced in coil 121b during intervals when transistor 122 is nonconductive.

In theory, all of the reactive energy present in coil winding 121a would be returned through coil winding 121b to source 12 during intervals when transistor 122 is nonconductive. However, in practice, close coupling beween coil windings 121a and 121b is difficult to obtain because of the "pancake" nature of coil 120. Therefore, a diode 125 is coupled at its anode and cathode to bus 27 of reactive power converter 26 and to the junction of coil winding 121a and transistor 122, respectively, for conducting the residual reactive current present in coil winding 121a during intervals when transistor 122 is nonconductive.

In operation, transistor 122 is rendered conductive at a frequency of at least 18 kHz to energy coil winding 121a which generates magnetic flux causing eddy currents to be circulated in the surface of pan 21, heating the pan. During intervals when transistor 122 is substantially nonconductive, a current equal to the major portion of reactive current present in coil winding 121a is induced in coil winding 121b and is conducted through diode 124 to source 12. Residual current present in coil winding 121a is conducted through diode 125 to reactive power converter 26 which stores the residual reactive coil energy for subsequent discharge across source 12. Since the major portion of reactive energy present in coil winding 121a during intervals when transistor 122 is nonconductive is returned to source 12 via coil winding 121b, the component ratings of the reactive power converter can be reduced by a factor 5 to 8 compared to the component ratings required for the reactive power converter employed with induction surface units 13a–13d of FIG. 1.

The foregoing describes a simple, low cost, highly efficient induction cooking unit which does not require costly resonant inverter power circuits. The induction cooking unit of the present invention allows each of the induction coils to be energized during the entire 360° of the AC input voltage cycle, thus realizing high efficiency.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. An induction cooking system for inductively heating metallic cooking utensils comprising:
    (a) a source of rectified AC;
    (b) at least one induction surface unit including:
        an induction coil adapted to generate a magnetic field to cause eddy currents to be circulated within the surface of a metallic cooking utensil positioned adjacent thereto so as to heat said utensil;
        switching means coupled in series with said source of rectified AC and said coil, said switching means being rendered conductive at a prescribed rate to energize said coil; and
        unidirectional conduction means coupled to said coil for conducting reactive current present in said coil during intervals when said switching means is rendered substantially nonconductive; and
    (c) reactive power converter means coupled to the unidirectional conduction means and the source of rectified AC of each said induction surface unit for storing the reactive energy present in the induction coil of each said induction surface unit during intervals when said switching means is rendered substantially nonconductive, said reactive power converter means discharging the stored reactive energy across said source of rectified AC at predetermined intervals, thereby permitting each of said induction coils to be energized during the entire 360° cycle of voltage supplied by said source of rectified AC.

2. The invention according to claim 1 wherein said source of rectified AC comprises:
   (a) a commercial AC source;
   (b) a full wave rectifier bridge coupled to said AC source for providing rectified AC current at the output;
   (c) a high frequency bypass capacitor coupled across the output of said full wave rectifier bridge, said high frequency bypass capacitor being of such magnitude as to pass substantial AC at frequencies above twice the commercial power frequency.

3. The invention according to claim 1 wherein said switching means comprises a transistor, the collector-emitter portion of said transistor being coupled in series with the induction coil of each said induction surface unit across said source of rectified AC.

4. The invention according to claim 1 wherein said reactive power converter means comprises:
   (a) a capacitor coupled to said unidirectional conduction means of each said induction unit and to said source of rectified AC, said capacitor storing the reactive energy present in said induction coil of each said induction surface unit during the intervals when said switching means of said induction surface unit is rendered substantially nonconductive; and
   (b) circuit means for discharging said capacitor across said source of rectified AC at predetermined intervals.

5. The invention according to claim 4 wherein said circuit means for discharging said capacitor comprises:
   (a) a transistor having a base, collector and emitter, the collector of said transistor coupled to the junction of said capacitor and said unidirectional conduction means of each said induction surface unit;
   (b) oscillator means coupled to the base of said transistor for supplying said transistor with base drive signals to render said transistor conductive during predetermined intervals;
   (c) an inductor coupled between the emitter of said transistor and the positive terminal of said source of rectified AC; and
   (d) a diode coupled between the junction of said inductor and said transistor emitter, and the negative terminal of said source of rectified AC, said diode providing a conduction path for current present in said inductor during intervals when said transistor is rendered substantially nonconductive.

6. An induction cooking system for inductively heating metallic utensils causing eddy currents to be circulated within the surface of such utensils comprising:
   (a) a source of rectified AC;
   (b) at least one induction surface unit comprising:
      an induction coil having first and second closely coupled windings adapted to generate a magnetic field to induce eddy currents within the surface of a utensil positioned adjacent to said coil so as to heat said utensil;
      switching means coupled in series with said first induction coil winding across said source of rectified AC, said switching means being rendered conductive at a prescribed rate;
      first unidirectional conduction means coupled in series with said second induction coil winding across said source of rectified AC for providing a conduction path for the reactive current induced in said second coil winding during intervals when said switching means is rendered substantially nonconductive; and
      second unidirectional conduction means coupled to the junction of said first induction coil winding and said switching means for providing a path to conduct the reactive current present in said first induction coil winding when said switching means is rendered substantially nonconductive; and
   (c) reactive power converter means coupled across said source of rectified AC and coupled to said second unidirectional conduction means of each of said induction surface units for storing the energy present in said first induction coil winding during intervals when said switching means is rendered substantially nonconductive, said reactive power converter means discharging said stored reactive energy across said source of rectified AC during predetermined intervals thereby permitting each of said induction coils to be energized during the entire 360° cycle of the voltage supplied by said source of rectified AC.

* * * * *